(12) United States Patent
Chater-Lea et al.

(10) Patent No.: US 7,783,289 B2
(45) Date of Patent: Aug. 24, 2010

(54) MOBILE COMMUNICATION SYSTEM AND CONTROLLER, MOBILE STATION AND METHOD FOR USE THEREIN

(75) Inventors: David J. Chater-Lea, Crowthorne (GB); Richard C. Lucas, Ash Vale (GB)

(73) Assignee: Motorola, Inc., Schaumburg, IL (US)

( * ) Notice: Subject to any disclaimer, the term of this patent is extended or adjusted under 35 U.S.C. 154(b) by 468 days.

(21) Appl. No.: 11/722,597

(22) PCT Filed: Dec. 2, 2005

(86) PCT No.: PCT/US2005/043515
§ 371 (c)(1),
(2), (4) Date: Jun. 22, 2007

(87) PCT Pub. No.: WO2006/073629
PCT Pub. Date: Jul. 13, 2006

(65) Prior Publication Data
US 2008/0146264 A1 Jun. 19, 2008

(51) Int. Cl.
*H04W 40/00* (2009.01)
*H04W 72/00* (2009.01)
*H04W 88/00* (2009.01)

(52) U.S. Cl. ............... 455/431; 455/525; 455/557; 455/553.1

(58) Field of Classification Search ............... None
See application file for complete search history.

(56) References Cited
U.S. PATENT DOCUMENTS
7,096,000 B2 * 8/2006 Yano ............... 455/345

(Continued)

FOREIGN PATENT DOCUMENTS
EP 1206153 5/2002

(Continued)

OTHER PUBLICATIONS

Uhlirz, M, "Concept of a GSM-Based Communication System for High-Speed Trains", Vehicular Technology Conference, 1994, IEEE 44th Stockholm, Sweden, Jun. 8-10, 1994, New York, NY, pp. 1130-1134, XP010123252, ISBN: 0-7803-1927-3, Paragraph V, Figure 1.

(Continued)

*Primary Examiner*—Philip J Sobutka
(74) *Attorney, Agent, or Firm*—Terri S. Hughes; Anthony P. Curtis

(57) ABSTRACT

A mobile communication system is described. The system has an infrastructure that includes base stations and has mobile stations, a mobile terminal and a mobile controller. Each mobile station is operable to communicate with one of the base stations. The mobile terminal is coupled to first and second mobile stations to provide a communication link to at least one of the base stations. The mobile controller sends instruction messages to the mobile stations regarding connectivity with the base stations. The mobile terminal, the mobile controller and the first and second mobile stations are carried on a moving object. The mobile controller makes decisions and issues instructions to the mobile stations relating to the base station by which they should each be served with to maintain a communication link between the mobile terminal and a serving base station via at least one of the mobile stations.

19 Claims, 2 Drawing Sheets

U.S. PATENT DOCUMENTS

2003/0235165 A1 12/2003 Wang
2004/0266444 A1 12/2004 Yano
2006/0084384 A1* 4/2006 Kiemunki ............ 455/575.2 X

FOREIGN PATENT DOCUMENTS

| | | |
|---|---|---|
| EP | 1401229 | 3/2004 |
| GB | 2346511 | 5/2007 |
| JP | 11225368 | 8/1999 |
| WO | WO0225979 | 3/2002 |

OTHER PUBLICATIONS

GB Search Report Dated May 31, 2005.
PCT Search Report Dated Apr. 4, 2006.

* cited by examiner

MOBILE COMMUNICATION SYSTEM AND CONTROLLER, MOBILE STATION AND METHOD FOR USE THEREIN

CROSS REFERENCE TO RELATED APPLICATIONS

This application claims the benefit of prior filed international application Serial No. PCT/US2005/43515 filed on Dec. 2, 2005, and Great Britain application Serial No. 0428465.9 filed on Dec. 31, 2004. Both of these applications are assigned to Motorola, Inc.

FIELD OF THE INVENTION

The present invention relates to a mobile communication system and a controller, mobile station and method for use therein.

BACKGROUND OF THE INVENTION

A cellular or trunked communication system is one in which mobile or portable user terminals, such as mobile telephones or portable or vehicle carried radios or data communication devices, herein collectively referred to as 'mobile stations', can communicate via a network infrastructure which generally includes a plurality of fixed base stations (base transceiver stations) and other installations. Each base station has one or more transceivers which serve mobile stations in a given region or area known as a 'cell' (or 'site') by radio communication. The cells of neighbouring base stations are often overlapping.

Generally, it is desirable for the mobile stations to be served by the base station which can provide the best signals to and from the mobile station. Since mobile stations can move from one region to another it is known for the mobile stations to monitor signals from different base stations, to operate a procedure to determine which base station can best serve the mobile station, to determine whether it would be worthwhile to switch from a current serving base station to another one and if appropriate to carry out such a switch. In the art, the procedure to monitor for and to make determinations regarding a possible switch is known as 'cell re-selection' procedure. The procedure to carry out a switch using such a determination is known as 'handover' or 'handoff'.

Generally, in cellular or trunked mobile communication systems, mobile stations operate independently. When cell re-selection or handover is needed, service may undesirably be delayed or even lost and this could be serious in situations in which it is necessary to maintain communication of information.

EP-A-1401229 describes a group of mobile stations on a moving vehicle such as a train which are communicating with a fixed base station. A controller is provided on the vehicle and operates to assist the mobile stations to undertake a cell handover as a group. Otherwise, the mobile stations operate independently in a normal manner.

BRIEF DESCRIPTION OF THE DRAWINGS

Embodiments of the invention will now be described by way of example with reference to the accompanying drawings.

DESCRIPTION OF EMBODIMENTS OF THE INVENTION

By the invention, a controller and at least two mobile stations can work together on a moving object such as a person or a vehicle. The controller can communicate with a base station via one or more of the mobile stations. The controller may receive information about possible serving base stations from the mobile stations and may operate to make decisions relating to cell re-selection and handover of the mobile stations and to issue instructions to the mobile stations with the objective of maintaining a communication link with a serving base station via at least one of the mobile stations, e.g., whilst another or the other mobile station is undertaking a search for cell re-selection or is undertaking cell handover.

Thus, the invention beneficially allows a communication link between the controller and at least one serving base station to be maintained at all times during movement of the object carrying the controller and the mobile stations. This may significantly improve the reliability of a communication link between a terminal on the moving body and a fixed network. For example, where the body is a moving train, this may improve the signalling and safety of the train.

The information transmitted between the controller and the base station via at least one of the mobile stations in embodiments of the invention may be any of the forms of information known to be suitable for communication by a radio link, e.g. audio information such as speech or music, numeric or text data, or picture or video information.

Figure 1:
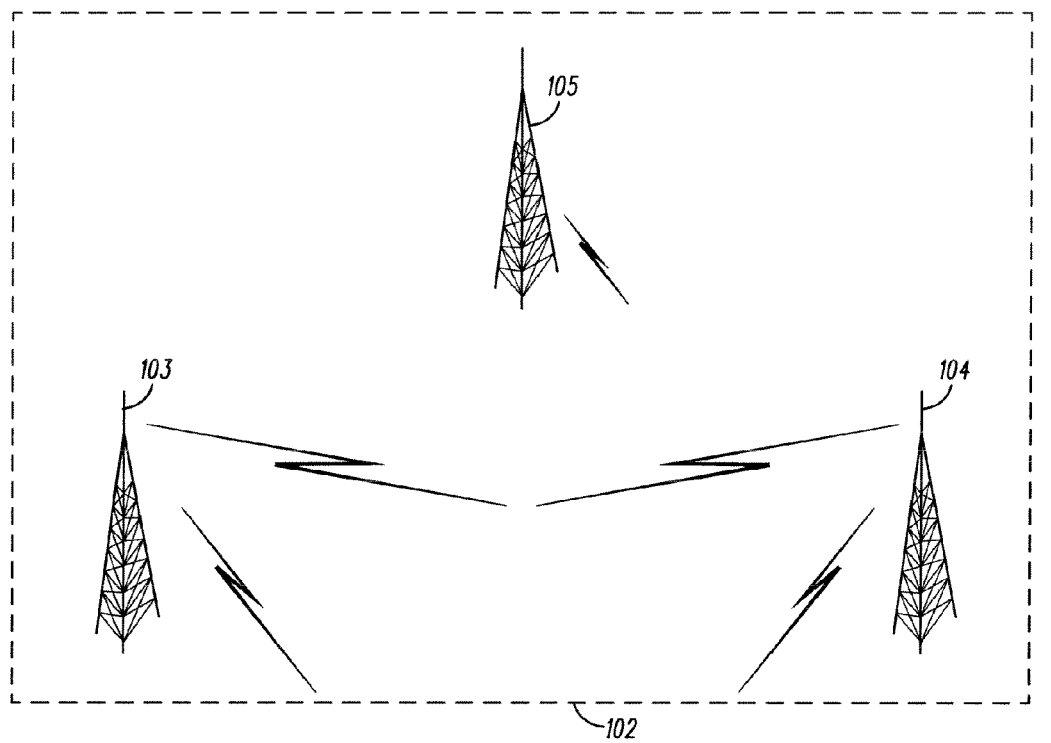
FIG. 1 is a schematic diagram of a mobile communication system.

As shown in FIG. 1, a communication system 100 includes a plurality of communication devices all carried on a moving body 101, e.g. a moving person or vehicle. These devices are described in more detail with reference to FIGS. 2, 3 and 4 later. The system 100 includes a fixed network 102 including base stations (base transceiver stations) and various other fixed installations interconnecting and controlling the base stations in a known manner. Three base stations 103, 104 and 105 are shown.

Figure 2:
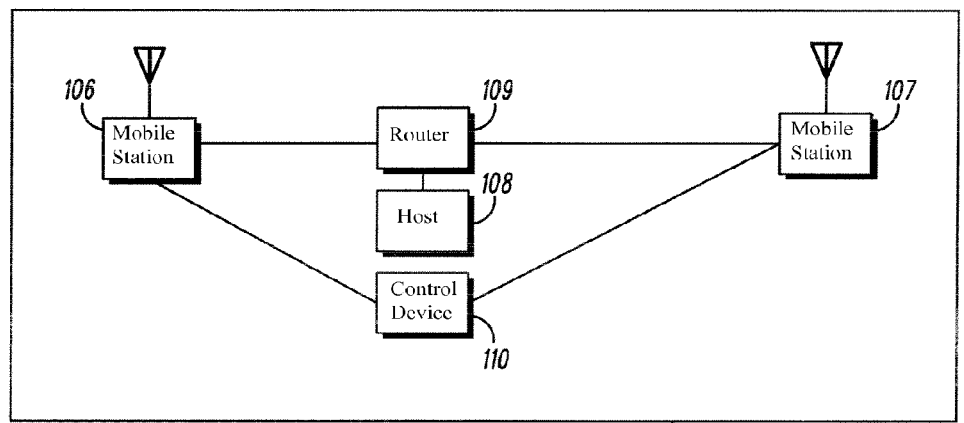
FIG. 2 is a block schematic diagram of an arrangement of communication devices included on a moving body in the system shown in FIG. 1.

FIG. 2 shows an arrangement of communication devices carried by the moving body 101. These devices include a first mobile station 106, a second mobile station 107, a host 108, a router 109 and a control device 110. The mobile stations 106 and 107 are able to communicate by radio with the network 102 (FIG. 1) in a manner to be described later. The network 102 can pass communications on to other (mobile or fixed) user terminals in a known manner. Likewise, other user terminals may send communications to the mobile stations via the network 102.

The host 108 comprises a user terminal which can send and receive user information in one of the forms referred to earlier via one or both of the mobile stations 106 and 107. This information is sent via one or both of the mobile stations 106, 107 via their serving base station, e.g. base station 103 or base station 104. This information sent between the host 108 and the mobile stations 106, 107 is sent via a single connection to the host 108 through the router 109. Alternatively, the information could be sent via separate connections.

The control device 110 has connections to the mobile stations 106 and 107 and carries out the following functions. It receives information from the mobile stations 106, 107 relating to their connectivity with the network 102, it makes decisions based upon the received information and it issues instructions to the mobile stations 106, 107.

The connections between the host 108 (or router 109) and the mobile stations 106, 107 and between the control device 110 and the mobile stations 106, 107 may be selected from wired connections, e.g. using electrical or optical signals, or wireless connections, e.g. using radio or microwave signals. Where one or more wireless connections are used, a short range link such as a Bluetooth link may be suitable.

The mobile stations 106, 107 thus have a communication path to the control device 110 to exchange control signals and information concerning their radio connections with the serving network 102. The connections between the mobile stations 106 and 107 can be direct (separate) as shown in FIG. 2 or via a router, which could be the same router 109 as that connecting the host 108 to the mobile stations 106, 107.

The control device 110 may, via its connection or connections with the mobile stations 106 and 107, operate to receive and/or make use of information as follows:

(i) it may retrieve a current signal strength or other signal measurement value (e.g. signal quality as measured by bit error rate) from each of the mobile stations 106, 107 to have knowledge of the current link quality of those mobile stations and the serving base station of each;

(ii) it may retrieve information concerning the identity and operational parameters of the respective serving base station of each of the mobile stations 106, 107;

(iii) it may receive current location information (e.g. from a GPS device or other location indicator associated with the control device 110 or one of the mobile stations 106, 107 or elsewhere on the moving body 101);

(iv) it may be aware of a direction of travel of the body 101 from the location information and/or from a stored, pre-defined description of a travel route of the body 101;

(v) it may be aware of information relating to communication service of the mobile stations 106, 107 by the network 102 such as potential serving base stations/cells for each location reached or to be reached;

(vi) it may ensure that at least one of the mobile stations 106, 107 provides a good quality connection to one of the base stations/cells of the serving network 102;

(vii) it may be aware of other aspects of the connectivity between the mobile stations 106, 107 and their serving base stations/cells, such as timing relationships.

(viii) it may issue messages to the mobile stations 106, 107 giving instructions regarding connectivity between the mobile stations 106, 107 and the base stations of the network 102.

The system 100 shown in FIGS. 1 and 2 may have various applications in mobile communications, Examples are described as follows.

In a first example, the mobile stations 106, 107 are on a moving body which is a railway train and are separated, e.g. are located in different parts of the train, e.g. at opposite ends of the train. The mobile stations 106, 107 may be mobile on the train or fixed in position on the train. The system 100 may operate in the following manner. Assume that the train is moving from left to right from the position indicated in FIG. 1 by reference numeral 101 to the position indicated by reference numeral 101a. Initially, the train is near the base station 103 but is heading toward the base station 104. Also, in the direction of travel toward the cell covered by the base station 104, the mobile station 107 is nearer the base station 104 than is the mobile station 106. In this example, the system 100 may operate as follows.

Initially, the mobile station 107 is served by the base station 103. As the train moves further into the cell covered by the base station 103, the signal strength (or other parameter used to measure signal link quality) of a received signal from the base station 103 increases. The control device 110 can direct the mobile station 106 to search for other available base stations to be a serving base station. Assuming that the mobile station 107 continues to receive a good quality of service from the base station 103, the mobile station 106 may search continuously, or if the base station 103 is also determined to provide the best quality of service for the mobile station 106, the mobile station 106 may be directed also to camp on the base station 103 as serving base station.

The router 109 will send traffic (user information to be communicated) via the mobile station 107 if the mobile station 106 is searching. If both of the mobile stations 106, 107 are camped on a particular base station (which may be the same or different for the two mobile stations), the router 109 can send traffic via both mobile stations, and may do this to improve the available bandwidth.

Once a peak in signal strength (or other parameter used to measure signal link quality) is detected by the mobile station 107, followed by a reduction in signal strength, or at an appropriate moment for example through knowledge of position and topology of network 102 and/or the route to be traveled, the control device 110 directs the mobile station 106 to camp on (become attached to for network service) the base station 107 and remain there. The router 109 then sends all traffic via mobile station 106. The control device 110 directs the mobile station 107 to search for a new serving base station/cell (or directs it to a known cell). This direction to search may be as soon as the mobile station 106 is camped on the base station 103, or at an appropriate point, such as when received signal strength falls below a pre-determined level.

When the mobile station 107 selects a new serving base station/cell, i.e. base station 104, and camps on that base station, the router 109 may additionally make use of the mobile station 107 to send traffic.

As time progresses, the link quality between the base station 103 and the mobile station 106 will deteriorate (i.e. when the mobile station 102 is leaving the cell coverage area of base station 103). The control device 110 will then issue an instruction that traffic is entirely routed through the mobile station 107. The mobile station 106 is then directed to search for a new serving base station or is directed to attach to the base station 104. Traffic can then be routed via the mobile station 106 to the base station 108 as well as or instead of via the mobile station 107.

As the train proceeds to the far side of the coverage area of the base station 104, the quality of the link between the mobile station 107 and the base station 104 deteriorates and the mobile station 107 is directed by the control device 110 to search for another serving base station. Communication is established between the mobile station 107 and a further serving base station (not shown) and traffic flow then proceeds between mobile station 107 and that further serving base station, and so on.

The control device 110 therefore has the following attributes:

i) it always ensures that one of the mobile stations 106, 107 remains in contact with an adequate serving base station of the network 102, and correspondingly never allows both of the mobile stations 106, 107 to be in cell searching or re-selection mode at the same time.

ii) it can use knowledge gained by one mobile station (107) to direct the other mobile station (106) to its next serving base station to "take over" the current traffic path to that base station.

iii) it may use one of its mobile stations (106 or 107) as a searching device over a relatively long period of time to establish a "stable" next cell (instead of finding an incorrect connection by spending too little time searching) whilst the other is maintaining a good traffic connection.

iv) it may also have some knowledge of the environment of the system 100 to assist in directing a mobile station (106 or 107) to find the next connection; this could include knowledge of current vehicle location and system topography and/or route traveled, or could provide some other operational aspect such as a sequential algorithm for assigning cell site frequencies.

The control device 110 may also provide inputs to the router 109 to indicate to the router which of the mobile stations 106, 107 is to send and receive communications.

In another example of use of the system 100 shown in FIG. 1, the mobile devices shown in FIG. 2 are carried by a human for use in personal communications. In this case, the mobile stations 106, 107 are in different places on the person's body, e.g. on the person's front and back, such that the body exhibits screening effects on the antennas of the respective mobile stations 106, 107 causing RF shadows in different directions. It will be apparent to a person of ordinary skill in the art that the mobile stations 106, 107 may easily be arranged in this manner. In this example, the control device 110 will ensure that at least one of the mobile stations 106, 107 has a connection to a serving base station/cell at all times. The operation is similar to the train borne example described earlier, except that knowledge of the serving base station of one mobile station may not necessarily be used to steer the other mobile station to the same base station to "take over" the traffic connection. The control device 110 will be required to recognise when one of the mobile stations 106, 107 is reaching a state of poor link quality, and to direct that mobile station to search for another cell/serving base station while the traffic connection is being maintained via the other mobile station.

In another example of use, the mobile devices of the system 100 may be carried together on an aeroplane. The control device 110 maintains knowledge of timing and position and determines when connectivity is suitable with each cell site. The control device 110 also ensures that at any time at least one of the mobile stations 106 and 107 maintains a connection within timing requirements with the network 102 via suitable base stations. In this case the timing requirements will be important since the aeroplane will pass quickly through the cell sites of the network 102.

Figure 3:
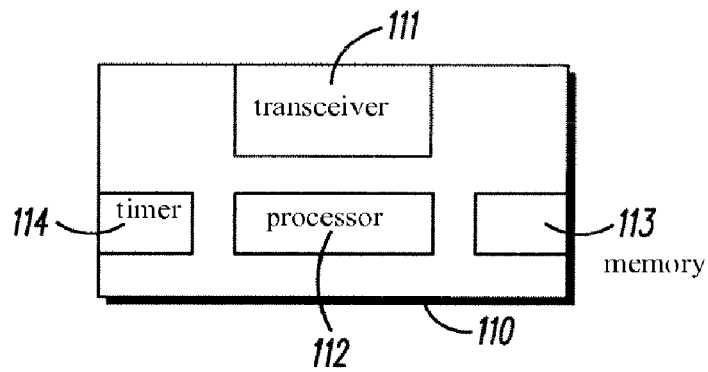
FIG. 3 is a block schematic diagram of a control device included in the devices shown in FIG. 2.

FIG. 3 shows in more detail some of the main components of the control device 110. The control device 110 includes a transceiver 111 which sends instruction signals to the mobile stations 106 and 107 and optionally to the router 109 and receives from the mobile stations 106 and 107 (and one or more other devices if appropriate) signals giving the required input information as described earlier. The control device 110 includes a processor 112 which controls operations of the device 110 and makes operational decisions based on the information it has available and provides signals for output by the transceiver 111. In practice, the processor 112 comprises one or more programmed digital signal microprocessors. The processor 112 works in conjunction with a memory 113 which stores data and programs needed by the processor 112 including operational data received in use from the mobile stations 106 and 107. The processor 112 also works in conjunction with a timer 114 which can be used to provide timing of operations by the processor 112.

Figure 4:
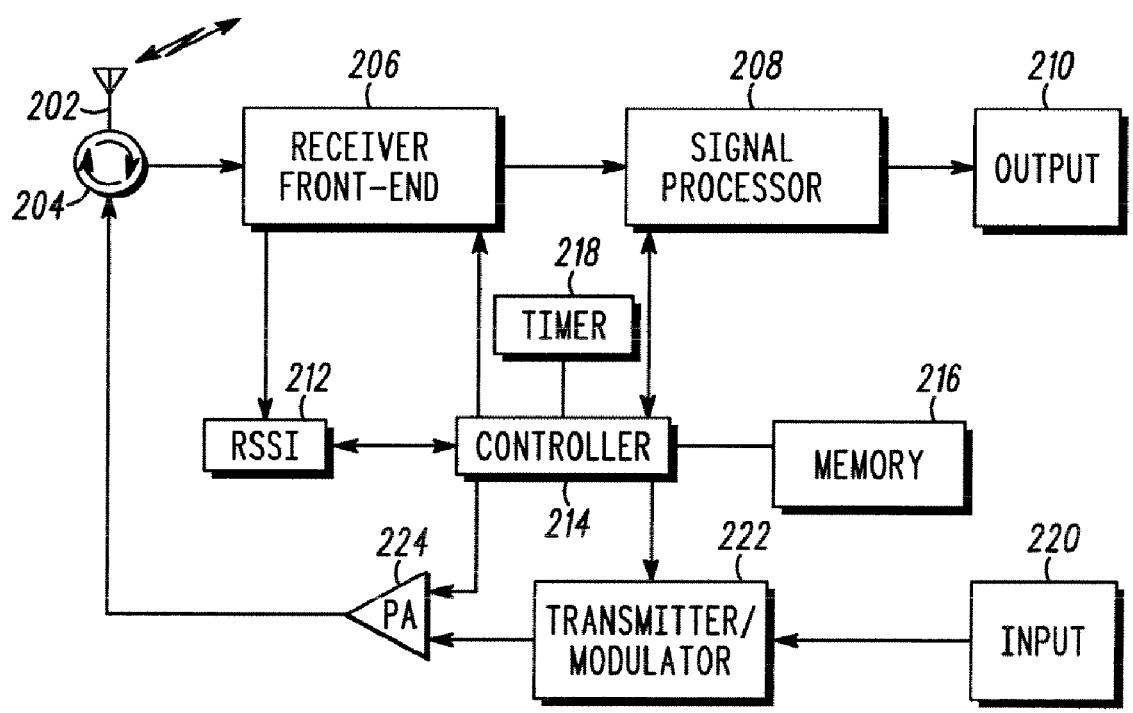
FIG. 4 is a block schematic diagram of a mobile station included in the devices shown in FIG. 2.

FIG. 4 shows an arrangement 200 of the main functional components of a mobile station (e.g. the mobile station 106 or 107) in the system 100 of FIGS. 1 and 2. The arrangement 200 includes an antenna 202 coupled to a circulator 204 (or switch or duplex filter) providing isolation between transmitter and receiver chains.

Incoming RF signals at the antenna 202 sent from a serving base station (such as the base station 103) are passed via the circulator 204 to a receiver chain which includes a receiver front-end 206 which comprises circuitry which provides reception, filtering and down-conversion to base-band frequency signals as well as scanning for cell selection. The receiver front-end 206 is serially coupled to a signal processor 208 which extracts information from a base-band signal recovered from the receiver front-end 206. The signal processor 208 operates under control of a controller 214 which generally controls all functional operations in the mobile station arrangement 100. The controller 214 is a programmed digital signal microprocessor. Output information from the signal processor 208 is provided to an output 210 for onward transmission to the host 108 (optionally via the router 109) and/or the control device 110. In practice, the output 210 may comprise a transceiver operating in a short range communication system linking the mobile stations 106, 107 to the host 108 and control device 110 optionally via the router 109

A RSSI (received signal strength indicator) 212 is also connected to the receiver front-end 206. The RSSI 212 measures the strength (energy) of a received signal in a known manner and provides an input to the controller 214 giving information relating to the RSSI value of a currently received signal.

Coupled to the controller 214 is a memory 216 which stores data and programs needed for use by the controller 214. A timer 218 is coupled to the controller 214 to control timing of operations within the arrangement 200.

The transmitter chain of the arrangement 200 begins with an input 220 which receives traffic information from the host 108 (optionally via the router 109) and control and instruction signals from the control device 110. In practice, the input 220 may comprise a transceiver, which may form part of a common device with the output 210, operating in a short range communication system linking the mobile stations 106, 107 to the host 108 and the control device 110 optionally via the router 109

The input 220 forwards input control or instructions from the control device 110 to the controller 214 which, by use of its operational programs stored in the memory 216, recognises the instructions received and controls operation of the mobile station accordingly, e.g. in respect of the base station the mobile station is to search for or become attached to in the manner describe in the earlier examples. The input 220 also receives input information or data to be communicated from a user operating the host 108 (FIG. 2) and provides this in turn to a transmitter/modulator 222 and a power amplifier (PA) 224, both of which are under the control of the controller 214. An output from the power amplifier 224 is provided as an output signal for radio transmission by the antenna 202 and is provided to the antenna 202 via the circulator 204. The output radio signal is sent to a serving base station such as the base station 103 of FIG. 1.

The various components within the arrangement 200 can be realised in a discrete or integrated form.

Thus, all RF signals received by the mobile station at the antenna 202 from the network 102 are passed via the circulator 204 to the receiver front-end 206, are extracted by the signal processor 208 and passed to the controller 214. Any received information to be saved is stored in the memory 216. All signals for sending in RF form to the network 102 are produced by the transmitter/modulator 222 from which they are passed via the power amplifier 224 and circulator 204 to be sent over the air by the antenna 202. Signals for use in system control are produced in baseband digital form by the controller 214 and are passed to the transmitter/modulator 222 for upconversion from baseband digital form to RF form.

The invention claimed is:

1. A mobile communication system comprising:
   an infrastructure which includes a plurality of base stations;
   a plurality of mobile stations each of which is operable to communicate with a selected one of the base stations;
   a mobile terminal operably coupled to at least a first one of the mobile stations and a second one of the mobile stations, wherein the mobile terminal is operable to communicate with one of the base stations via at least one of the first and second mobile stations; and
   a mobile controller which is operable to send an instruction message to the first mobile station instructing the first mobile station with which of the base stations to maintain a communication link while the second mobile station is searching for a different base station to provide communication service or is undergoing communication service handover from one base station to another base station.

2. A system according to claim 1 wherein the mobile terminal, the mobile controller and the first and second mobile stations are all carried on a mobile object.

3. A system according to claim 2 wherein the mobile object comprises a person.

4. A system according to claim 2 wherein the mobile object comprises a vehicle.

5. A system according to claim 4 wherein the vehicle is a train, tram, aeroplane, waterborne vehicle or road vehicle.

6. A system according to claim 2 wherein the mobile controller is operable to at least one of receive or store information relating to one or more of:
   (i) current location of the moving object;
   (ii) a route to be traveled by the moving object;
   (iii) layout of a fixed communication network capable of being a serving network to the first and second mobile stations;
   (iv) geographical topography along a route to be traveled by the mobile object; and
   (v) location, identity or operational parameters of base stations capable of being serving base stations to the mobile stations.

7. A system according to claim 1 wherein the mobile controller is operable to send instruction messages to the first and second mobile stations related to the base stations the first and second mobile stations should use.

8. A system according to claim 7 wherein the mobile controller is operable to receive from the first and second mobile stations information relating to the strength or quality of signals received by the first and second mobile stations from actual or potential serving base stations.

9. A system according to claim 8 wherein the mobile controller is operable to make decisions relating to the selection of base station to provide communication service to the first and second mobile stations based on the received information.

10. A system according to claim 9 wherein the mobile controller is operable to make decisions relating to the selection of base station with the objective of maintaining a communication link between at least one of the first and second mobile stations and a current serving base station.

11. A system according claim 1 further comprising a router operably coupled between the mobile terminal and the mobile stations to route communications between the mobile terminal and the mobile stations.

12. A system according to claim 11 wherein the mobile controller is operable to send instruction messages to the mobile stations and to the router relating to the routing of communications between the mobile terminal and the mobile stations.

13. A mobile controller comprising:
   a transceiver operable to send instruction signals to first and second mobile stations;
   a processor operable to control operations of the controller and make operational decisions based on information the processor has available and provides signals for output by the transceiver; and
   a memory operable to store data and programs for the processor,
   wherein the processor is operable to send a message to the first mobile station instructing the first mobile station to maintain a communication link with a particular base station while the second mobile station is searching for a base station to provide communication service or is undergoing communication service handover from one base station to another base station.

14. A mobile controller according to claim 13, wherein the mobile controller is carried on a mobile object.

15. A mobile controller according to claim 14, wherein the mobile controller is operable to at least one of receive or store information relating to one or more of:
   (i) current location of the moving object;
   (ii) a route to be traveled by the moving object;
   (iii) layout of a fixed communication network capable of being a serving network to the mobile stations;
   (iv) geographical topography along a route to be traveled by the mobile object; and
   (v) location, identity or operational parameters of base stations capable of being serving base stations to the mobile stations.

16. A mobile controller according to claim 13, wherein the mobile controller is operable to send to the first and second mobile stations instruction messages relating to the base stations the first and second mobile stations should use.

17. A mobile controller according to claim 13, wherein the mobile controller is operable to receive from the first and second mobile stations information relating to the strength or quality of signals received by the first and second mobile stations from actual or potential base stations.

18. A method of operation in a mobile communication system which includes an infrastructure including a plurality of base stations, a plurality of mobile stations each of which is operable to communicate with a selected one of the base stations, a mobile user terminal and a mobile controller, the method comprising:
   sending communications between the mobile terminal and at least one of the base stations via at least one of first and second mobile stations; and
   sending instruction messages from the mobile controller to the first and second mobile stations regarding connectivity of the first and second mobile stations with the base stations, the instruction messages instructing the first mobile station with which of the base stations to maintain a communication link while the second mobile station is searching for a different base station to provide communication service or is undergoing communication service handover from one base station to another base station.

19. A method according to claim 18 wherein the mobile terminal, the mobile controller and the first and second mobile stations are carried on a moving object.

* * * * *